(12) United States Patent
Haase et al.

(10) Patent No.: US 11,440,258 B2
(45) Date of Patent: Sep. 13, 2022

(54) 3D PRINTING TOOL FOR MACHINE TOOLS

(71) Applicant: Siemens Aktiengesellschaft, Munich (DE)

(72) Inventors: Andreas Haase, Chemnitz (DE); Karl-Heinz Smolka, Chemnitz (DE)

(73) Assignee: Siemens Aktiengesellschaft, Munich (DE)

( * ) Notice: Subject to any disclaimer, the term of this patent is extended or adjusted under 35 U.S.C. 154(b) by 99 days.

(21) Appl. No.: 16/647,330

(22) PCT Filed: Aug. 22, 2018

(86) PCT No.: PCT/EP2018/072639
§ 371 (c)(1),
(2) Date: Mar. 13, 2020

(87) PCT Pub. No.: WO2019/052794
PCT Pub. Date: Mar. 21, 2019

(65) Prior Publication Data
US 2021/0154935 A1    May 27, 2021

(30) Foreign Application Priority Data

Sep. 14, 2017  (EP) .................................. 17191095

(51) Int. Cl.
*B29C 64/321*      (2017.01)
*B29C 64/118*      (2017.01)
(Continued)

(52) U.S. Cl.
CPC .......... *B29C 64/321* (2017.08); *B29C 64/118* (2017.08); *B29C 64/295* (2017.08);
(Continued)

(58) Field of Classification Search
CPC ... B29C 64/321; B29C 64/118; B29C 64/295; B29C 64/393; B33Y 30/00
See application file for complete search history.

(56) References Cited

U.S. PATENT DOCUMENTS

| 6,054,077 A | 4/2000 | Comb et al. |
| 2007/0003656 A1 | 1/2007 | LaBossiere et al. |

(Continued)

FOREIGN PATENT DOCUMENTS

| CN | 103231517 A | 8/2013 |
| CN | 104384936 A | 3/2015 |

(Continued)

OTHER PUBLICATIONS

English translation for DE102014109246 (Year: 2016).*
(Continued)

*Primary Examiner* — Joseph S Del Sole
*Assistant Examiner* — Mohamed K Ahmed Ali
(74) *Attorney, Agent, or Firm* — Henry M. Feiereisen LLC (57) ABSTRACT

A device for coupling to a spindle of a machine tool includes a holder for coupling to the spindle of the machine tool, a conveyor element configured to convey a filament and rotatable about an axis of rotation, and a material processing unit. The material processing unit includes a gear which includes a force-receiving element configured to receive a mechanical force from the spindle and rotatable about an axis of rotation which extends substantially orthogonal to the axis of rotation of the conveyor element, and a force-delivery element configured to deliver to the conveyor element the mechanical force transmitted purely mechanically from the force-receiving element, with the force-receiving element being configured separately from the force-delivery element.

19 Claims, 3 Drawing Sheets

(51) Int. Cl.
    *B29C 64/295*     (2017.01)
    *B29C 64/393*     (2017.01)
    *B33Y 10/00*     (2015.01)
    *B33Y 30/00*     (2015.01)
    *B33Y 40/00*     (2020.01)
    *B33Y 50/02*     (2015.01)

(52) U.S. Cl.
    CPC ............. *B29C 64/393* (2017.08); *B33Y 10/00* (2014.12); *B33Y 30/00* (2014.12); *B33Y 40/00* (2014.12); *B33Y 50/02* (2014.12)

(56) References Cited

U.S. PATENT DOCUMENTS

2015/0165694 A1    6/2015    Lee et al.
2015/0331412 A1   11/2015   Adair et al.

FOREIGN PATENT DOCUMENTS

| | | |
|---|---|---|
| CN | 106671413 A | 5/2017 |
| DE | 102014106776 A1 | 11/2015 |
| DE | 102014109246 A1 | 1/2016 |
| DE | 112015001860 T5 | 3/2017 |

OTHER PUBLICATIONS

Carsten: "Umrüsten CNC Fräse nach 3D Drucker? (Temporär)", Internet Citation, pp. 1-4, XP002743768, found on theInternet: URL:http://www.mikrocontroller.net/topic/315745, found on Aug. 27, 2015, pp. 1-2; 2013.

PCT International Search Report and Written Opinion of International Searching Authority dated Dec. 10, 2018 corresponding to PCT International Application No. PCT/EP2018/072639 filed on Aug. 22, 2018.

\* cited by examiner

3D PRINTING TOOL FOR MACHINE TOOLS

CROSS-REFERENCES TO RELATED APPLICATIONS

This application is the U.S. National Stage of international Application No. PCT/EP2018/072639, filed Aug. 22, 2018, which designated the United States and has been published as International Publication No. WO 20191052794 A1 and which claims the priority of European Patent Application, Serial No, 17191095.3, filed Sep. 14, 2017, pursuant to 35 U.S.C. 119(a)-(d).

BACKGROUND OF THE INVENTION

The invention relates to a device for coupling to a spindle of a machine tool comprising a holder for coupling to the spindle of the machine tool and a material processing unit. The invention further relates to a machine tool with a spindle comprising such a device and to a method for additive manufacturing, in particular by means of fused deposition modeling, for forming a molded part using such a device.

The patent DE112015001860T5 discloses an interchangeable unit adapted to be coupled to a computer numerical control machine. The interchangeable unit comprises a holder that is coupled to a spindle of the CNC machine, a controller to receive a rotational speed of the spindle as an input and a material processing unit, which executes a first function in response to a first rotational speed range of the spindle and a second function in response to a second rotational speed range of the spindle. The patent also describes an extruder, which can be coupled to a CNC device. This comprises a holder and a generator that converts rotary motion of the spindle into power for a motor for moving the extruder. The extruder provides an extruded material to form a part in response to a rotational speed of the spindle.

The interchangeable unit converts rotational energy of the spindle into electrical energy by means of a generator. The electrical energy acquired in this way is then reconverted back into rotational energy by means of a motor to drive the extruder.

It is an object of the invention to improve such a device, preferably to reduce complexity.

SUMMARY OF THE INVENTION

According to one aspect of the invention, the object is achieved by a device for coupling to a spindle of a machine tool comprising a holder for coupling to the spindle of the machine tool and a material processing unit, wherein the material processing unit comprises a gear, which comprises a force-receiving element and a force-delivery element, wherein the force-receiving element is embodied to receive a mechanical force from the spindle, wherein the force-delivery element is embodied to deliver a mechanical force to a conveyor element, wherein the conveyor element is embodied to convey a filament, wherein the transmission of the force absorbed by the force-receiving element to the force-delivery element takes place purely mechanically.

Further advantageous embodiments are derived from the subclaims.

According to another aspect of the invention, the object is achieved by a machine tool with a spindle with a device as set forth above.

According to still another aspect of the invention, the object is also achieved by a method for additive manufacturing, in particular by means of fused deposition modeling, for forming a molded part using a device as set forth above with the following steps:
transmission of the force from the spindle to the conveyor element by means of the gear,
reception of a filament by the material processing unit,
conveyance of the filament in the direction of a delivery element, in particular in the direction of a nozzle,
heating the filament in the delivery element by means of a heating element, delivering the heated filament.

A machine tool is considered to be a production machine that effects the action of a tool on a workpiece under mutual guidance. It usually takes over the handling of the tool and workpiece and the reception, processing and feedback of information relating to a manufacturing process. A machine tool is a mechanized and preferably automated machine that creates a prespecified shape on the workpiece or a change to a prespecified shape on a workpiece through relative motion between the workpiece and the tool.

The machine tool preferably comprises a tool-carrying spindle, wherein the tool can be changed both manually and automatically. Due to the high possible rotational speed, such spindles allow very precise processing of the workpiece. Herein, the workpiece can, for example, be machined by means of milling or turning.

A machine tool is preferably combined with a modern control unit. These CNC machine tools—CNC stands for computer numerical control—are able to machine workpieces with high precision and fully automatically.

Herein, the term "coupling" indicates a connection between the device and the spindle of the machine tool. Herein, different types of connection are conceivable, such as, for example, connections by means of bolts, screws, threads, magnets, electromagnets, adhesives or other bonding means or welding. Snap connections or clamp connections and further non-positive or positive connections are possible.

The device comprises a holder for coupling to the spindle of the machine tool and a material processing unit.

The holder is preferably embodied such that it permits one of the aforementioned types of connection.

The material processing unit comprises a gear comprising a force-receiving element and a force-delivery element. The force-receiving element is embodied to receive a mechanical force from the spindle. The force-delivery element is embodied to deliver a mechanical force to a conveyor element. The conveyor element is embodied to convey a filament. The transmission of the force received by the force-receiving element to the force-delivery element takes place purely mechanically.

A gear is a machine element, which transmits and/or converts a force, a rotational speed, a motion, in particular a rotary motion, or a moment, in particular a torque. The gear can be designed as a gear with a uniform translation and also as a gear with a non-uniform translation.

Herein, translation characterizes a ratio—also called a translation ratio—of a force to be received on the input side (for example rotational speed, torque) to a force to be delivered on the output side.

The device has the advantage that a filament can be conveyed in a simple manner. Since the transmission of the force received by the force-receiving element to the force-delivery element takes place purely mechanically, the device is not susceptible to errors, is inexpensive and is also a low-loss device.

A compact design is also possible. Moreover, the amount of control technology required is low since the conveyor element can be controlled directly via the rotational speed of the spindle.

In one advantageous embodiment of the invention, the force-receiving element is embodied to receive a torque from the spindle.

The force-receiving element is preferably directly connected to the spindle. Herein, various types of connection are conceivable, such as snap connections, clamp connections or other non-positive or positive connections. Also conceivable are connections by means of bolts, screws, threads, magnets, electromagnets, adhesives or other bonding means or welding.

In a further advantageous embodiment of the invention, the force-delivery element is embodied to deliver the torque to the conveyor element.

The force-delivery element can deliver a torque corresponding to the torque received by the force-receiving element. However, it is also possible for a higher or lower torque to be delivered. Here, a higher torque results in a lower rotational speed. A lower torque results in a higher rotational speed.

In a further advantageous embodiment of the invention, the force-receiving element is embodied separately from the force-delivery element. An axis of rotation of the torque received by the force-receiving element is preferably substantially orthogonal to an axis of rotation of the conveyor element supplied by the force-delivery element.

The two axes of rotation are preferably perpendicular to one another. This reduces the complexity of the gear. However, other angles are also possible.

In a further advantageous embodiment of the invention, the gear is embodied as a combination gear, which combines a gear train comprising a first gear wheel and a second gear wheel with a worm gear comprising a worm shaft and a worm wheel.

In one exemplary embodiment of the combination gear, the first gear wheel is preferably directly connected to the spindle. Herein, the first gear wheel is the force-receiving element since it receives force directly from the spindle.

The second gear wheel paired with the first gear wheel is part of the worm shaft or non-rotatably connected to the worm shaft. This represents the force-delivery element.

The force-delivery element is in particular the element that delivers force directly to the conveyor element. In this case, the second gear wheel.

The worm shaft is paired with the worm wheel. In the exemplary embodiment, the worm wheel is the conveyor element. The force-delivery element delivers the force to the conveyor element.

It is also conceivable for the second gear wheel to be connected to the worm shaft by means of a further gear.

Also conceivable are other types of gear which enable a purely mechanical force transmission, for example bevel gears.

Suitable materials for the gear wheels, the worm shaft and/or the worm wheel are metal or plastic. Alloys made of carbon and iron or various steels are particularly suitable.

With a worm gear, a worm shaft comprising a material with a first hardness is preferably paired with a worm wheel with a material comprising a second hardness, wherein the second hardness is softer than the first hardness in order to reduce friction. For example, the worm shaft comprises hardened steel. For example, the worm wheel comprises brass or bronze.

The gear train and/or the worm gear comprise a lubricating element. The lubricating element is preferably grease or oil.

The lubricating element is preferably able to dissipate heat.

A worm shaft with helical teeth is particularly suitable as a worm shaft, wherein one tooth winds helically around a wheel axis and this tooth contains at least one elastomer. For example, a rubber tooth forms the toothing of the worm shaft.

Herein, the paired worm wheel does not require any toothing. Herein, one advantage is that this enables a filament to be conveyed without the filament becoming caught in a tooth of the worm wheel. In addition, herein it is possible to dispense with the lubricating element that could adhere to the filament.

In a further advantageous embodiment of the invention, the conveyor element comprises two opposing pressure rollers.

A pressure roller is a cylindrical body enclosed by a lateral surface and two circular bases.

Preferably, as explained above, the force from the spindle acts on at least one of the two pressure rollers.

The force-delivery element delivers the force to the conveyor element. In this case, the force-delivery element delivers the force to at least one pressure roller.

The second pressure roller is preferably mounted rotatably on an axis perpendicular to an idealized circular base.

However, it is also possible for both pressure rollers to be driven by the spindle by means of one or more gears.

In addition, the conveyor element can also comprise three or more pressure rollers. However, it has been found to be advantageous to have an even number that enables a respective opposing arrangement of the pressure rollers.

The force from the force-delivery element is delivered to at least one of the pressure rollers in the arrangement.

In a further advantageous embodiment of the invention, the conveyor element is used to convey the filament in the direction of a delivery element, in particular in the direction of a nozzle of the delivery element.

The direction of rotation of the pressure rollers is preferably such that the filament is conveyed in the direction of the delivery element. The direction of the filament emerging from the nozzle is preferably substantially parallel to the axis of rotation of the spindle.

Preferably, the rotational speed of the spindle determines the rotational speed of the conveyor element with reference to the translation ratio of the gear and hence also the speed at which the filament is conveyed in the direction of the delivery element.

The machine tool preferably comprises a control unit. The machine tool can be informed of the desired rotational speed of the spindle. The machine tool is preferably embodied as a CNC machine tool. The control unit is preferably embodied to determine, based on at least one material property of the filament, a speed specific to a material property, in particular a rotational speed, of the spindle.

The nozzle is preferably part of a 3D print head.

In a further advantageous embodiment of the invention, the device comprises a filament-receiving means for receiving a filament.

The filament is preferably received by a channel in the spindle. The channel is preferably designed to supply a coolant and/or a lubricating element.

Furthermore, a filament spool is also possible. With a filament spool, the filament is preferably wound around the spindle head and/or deposited on the spindle head in an annular fashion.

The filament comprises preferably a molding wax, thermoplastic, thermoset or another type of plastic. However, it is also possible for other materials to be used, for example metals such as silver, gold, tin, copper or brass.

In general, suitable substances are those that can be thermoformed, preferably in a temperature range. The temperature range is preferably between 150° C. and 300° C., in particular between 200° C. and 270° C.

In a further advantageous embodiment of the invention, the material processing unit comprises at least one heating element.

The heating element is preferably integrated in the material processing unit. However, an external heating element connected to the material processing unit is also possible.

In a further advantageous embodiment of the invention, the heating element is arranged in the delivery element.

The heating element is preferably arranged on or in the immediate vicinity of the nozzle of the delivery element.

The filament is conveyed by means of the conveyor element in the direction of the nozzle, heated to a temperature at which it can be thermoformed, and delivered.

Preferably, a sequence, a pattern or another specification is stored in the control unit. This pattern, sequence or specification can be used as the basis for the conveyance, heating and delivery of the filament in the direction of the nozzle.

In a further advantageous embodiment of the invention, the material processing unit is used to form a molded part based on the filament.

The molded part is preferably stored as a data record (for example a CAD file) in the machine tool, preferably in the control unit. Based on the data record, the control unit controls the spindle in such a way that the molded part can be created.

The device is preferably embodied as a 3D print head. The 3D print head creates a molded part based on the filament and the pattern stored in the control unit or the sequence or specification stored in the control unit.

In a further advantageous embodiment of the invention, the device comprises a communication interface for communicating with a control unit.

In addition, the device preferably comprises at least one sensor. The communication interface can acquire data from the sensor. This enables, for example, a temperature of the heating element, a rotational speed of the spindle and a rotational speed of the conveyor element to be acquired and transmitted to the control unit.

In this way, the communication interface ensures safe operation of the device.

The communication is preferably accomplished by means of a bus system or by means of Industrial Ethernet. It is also however possible for other types of communication technology to be used.

In a further advantageous embodiment of the invention, the above-explained device is used for additive manufacturing, in particular by means of fused deposition modeling, of a molded part.

Fused deposition modeling is an additive manufacturing process used to build up a molded part layer-by-layer from a meltable material or a material that can be thermoformed when heat is supplied. Fused deposition modeling is also known as "fused filament fabrication".

With fused deposition modeling, the filament can be heated and delivered drop-by-drop from the nozzle or delivered as an extrudate from the nozzle.

In a further advantageous embodiment of the invention, a machine tool with a spindle comprises a device of this kind that can be coupled to the spindle.

This has the advantage that existing machine tools can be equipped with the device. It is not necessary to procure an expensive new 3D printer.

The device is preferably embodied as an interchangeable device that can be interchanged by a customer as required.

This has the advantage that it enables an alternative operation of the machine tool, for example as a milling machine.

The invention discloses a method for additive manufacturing, in particular by means of fused deposition modeling, for forming a molded part with the above-explained device.

Herein, the transmission of the force from the spindle to the conveyor element by means of the gear takes place purely mechanically.

Here, the relationship between force and torque is applicable: torque indicates how strongly a force acts on a rotationally mounted body.

Rotationally mounted bodies are preferably the spindle and the pressure rollers.

The filament is received by the material processing unit and conveyed in the above-described manner in the direction of the delivery element, in particular in the direction of a nozzle. The filament is preferably heated in the delivery element, in particular by means of the heating element, and delivered by the delivery element.

The heated filament is preferably delivered drop-by-drop or as an extrudate.

The heated filament is preferably delivered onto a work table or some other kind of working surface. However, it is also possible, for example, for a heated filament made for example of plastic to be delivered into or onto metal parts or other parts.

The work table can be embodied as movable and, for forming a molded part, can move for example according to a specification on preferably predetermined axes.

It is further also possible for a spindle head or a part of the machine tool that comprises the spindle to be embodied on preferably predetermined axes.

The invention offers a, preferably interchangeable, device, which performs functions of 3D print head. The invention offers a convenient and inexpensive solution for a 3D printing tool for machine tools.

The rotational speed of the spindle can be entered into the control unit. Herein, material properties of the filament can be taken into account. The rotational speed of the spindle determines the speed of the material feed of the filament with reference to the translation ratio of the gear. No external drive is required for the material feed.

The device can form a self-contained unit in which no additional drives or cables are required.

The device is preferably coupled to the spindle of the machine tool. Herein, the device is preferably anchored in a tool shank, which hitherto was also used to anchor milling tools for example. However, preferably the spindle remains rotatable.

The invention offers the advantage of lower mechanical and electrical costs and reduced complexity.

BRIEF DESCRIPTION OF THE DRAWING

The following describes and explains the invention in more detail with reference to the exemplary embodiments depicted in the figures, which show.

DETAILED DESCRIPTION OF PREFERRED EMBODIMENTS

Figure 1:
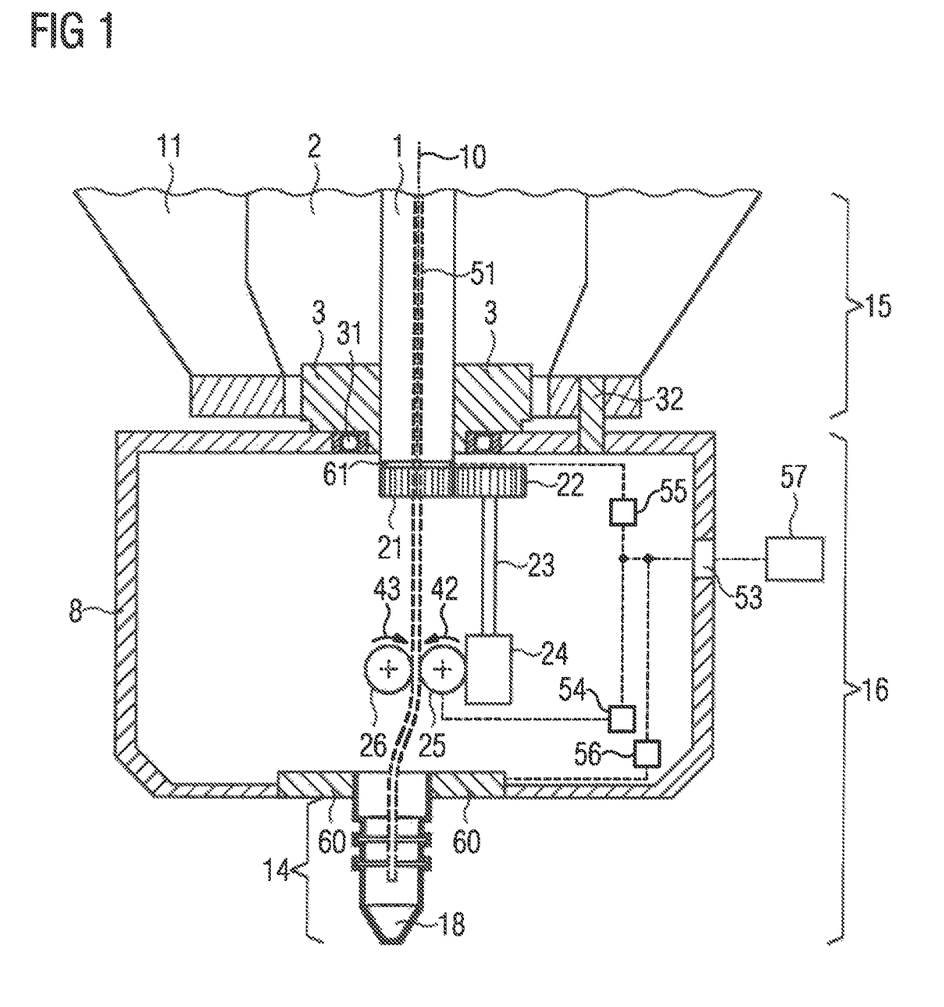
FIG. 1 an embodiment of the device with a driven pressure roller and filament reception by a channel of a spindle, FIG. 2 an embodiment of the device with two driven pressure rollers and annular filament reception, FIG. 3 a method for additive manufacturing by means of a device according to the invention.

FIG. 1 shows an embodiment of the device with a driven pressure roller 25 and filament reception by a channel of a spindle 1.

A spindle housing 11 comprises a spindle head 2. The spindle head 2 comprises the spindle 1. According to the prior art, these components are part of a machine tool 15. The spindle 1 rotates about an axis of rotation 10. The device 16 is fastened in the tool shank 3. The device 16 comprises a ball bearing 31 and a device housing 8 and is coupled to the spindle 1 by means of the holder 61. In addition, in the figure, the device 16 is fastened by a fastening element 32 to the spindle housing 11 of the machine tool 15, which is preferably embodied as a CNC machine tool. The spindle 1 should rotate in the device 16, but the device 16 should not rotate simultaneously.

In the figure, a gear is embodied as a combination gear. This comprises a gear train with a first gear wheel 21 and a second gear wheel 22. The gear train is combined with a worm gear comprising a worm shaft 24 and a worm wheel 25.

The figure shows an optional connecting rod 23 that connects the second gear wheel 22 to the worm shaft 24 in a non-rotatable manner. The second gear wheel 22 can also be connected directly to the worm shaft 24.

The first gear wheel 21 is directly connected to the spindle 1. Herein, the first gear wheel 21 is the force-receiving element since it receives the force from the spindle 1.

The second gear wheel 22 paired with the first gear wheel 21 is part of the worm shaft 24 or connected to the worm shaft 24 in a non-rotatable manner. This represents the force-delivery element.

The worm shaft 24 is paired with the worm wheel 25. The worm wheel 25 is a pressure roller and hence part of the conveyor element. The arrow 42 shows the direction of rotation of the worm wheel 25. As a force-delivery element, the worm shaft 24 delivers the force to the conveyor element.

The pressure roller 26 with the direction of rotation 43 is arranged opposite.

The device comprises a heating element 60 for heating a filament 51.

The two pressure rollers 25 and 26 convey a filament 51, which is guided through a channel in the spindle 1, in the direction of a delivery element 14. Herein, the pressure roller 25 is actively moved.

The pressure roller 25 has two functions: on the one hand, as a worm wheel it is part of the worm gear, on the other hand, as a pressure roller it is part of the conveyor element. The pressure roller 26 has only a function as a pressure roller.

The delivery element 14 comprises a nozzle 18 for delivering the heated filament 51.

The device 16 also comprises a communication interface 53, by means of which information is transmitted to a control unit 57, which is preferably part of the CNC machine tool. In the figure, the device comprises by way of example a sensor 55 for measuring the rotational speed of the spindle 1, a sensor 54 for measuring the rotational speed of the pressure roller embodied as a worm wheel 25 and a sensor 56 for measuring the temperature of the heating element 60.

Figure 2:
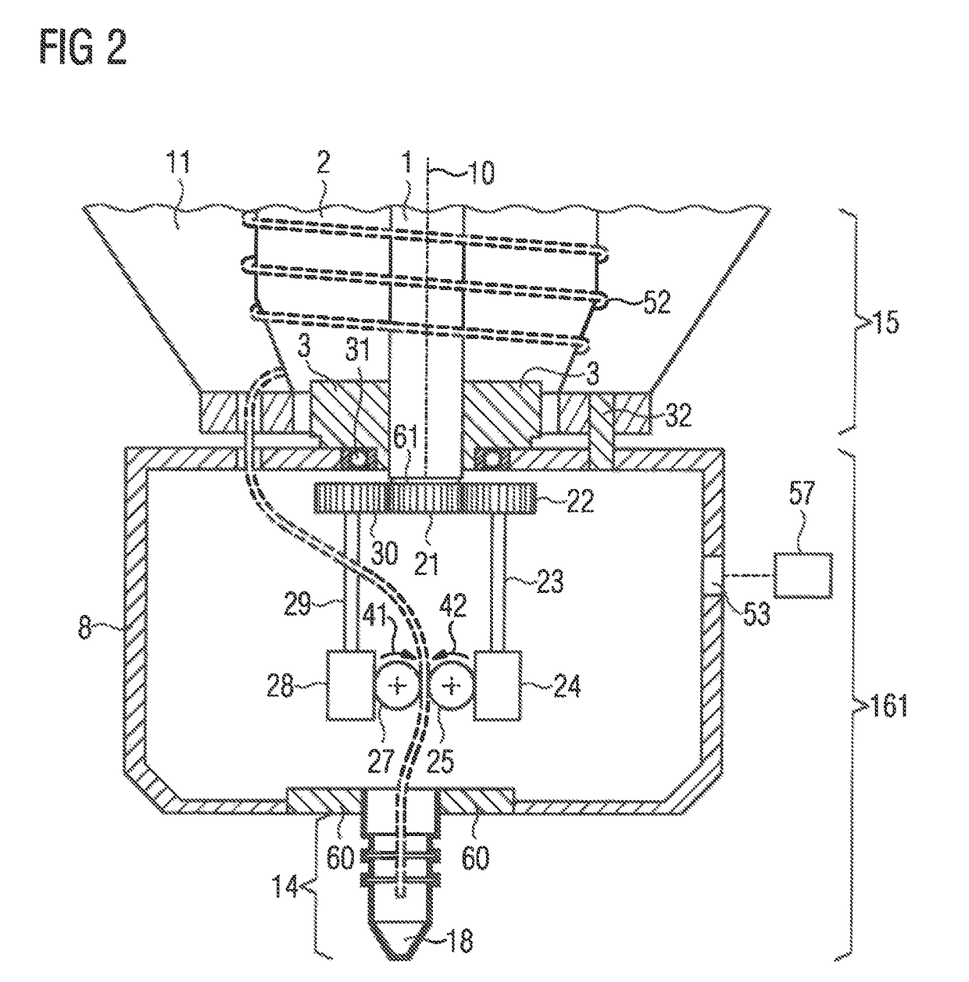

FIG. 2 shows an embodiment of the device with two driven pressure rollers 25 and 27 and an annular filament receiver.

The spindle housing 11 comprises the spindle head 2. The spindle head 2 comprises the spindle 1. These components are part of the machine tool 15 according to the prior art. The spindle 1 rotates about the axis of rotation 10. The device 161 is fastened in the tool shank 3. The device 161 comprises the ball bearing 31 and the device housing 8 and is coupled to the spindle 1 by means of the holder 61. In addition, in the figure, the device 161 is fastened by the fastening element 32 on the spindle housing 11 of the machine tool 15, which is preferably embodied as a CNC machine tool. The spindle 1 should rotate in the device 16, but the device 161 should not rotate simultaneously.

In the figure, a gear is embodied as a combination gear.

In contrast to FIG. 1, in FIG. 2, both pressure rollers 25 and 27 are actively driven.

The combination gear comprises a first gear train with the first gear wheel 21 and the second gear wheel 22. The gear train is combined with a worm gear comprising the worm shaft 24 and the worm wheel 25.

The figure shows an optional connecting rod 23, which connects the second gear wheel 22 to the shaft 24 in a non-rotatable manner. The second gear wheel 22 can also be directly connected to the worm shaft 24.

In addition, the gear comprises a second gear train with the first gear wheel 21 and a third gear wheel 30. The gear train is combined with a worm gear comprising the worm shaft 28 and the worm wheel 27.

The figure shows an optional connecting rod 29, which connects the third gear wheel 30 to the worm shaft 28 in a non-rotatable manner. The third gear wheel 30 can also be directly connected to the worm shaft 28.

The first gear wheel 21 is directly connected to the spindle 1. Herein, the first gear wheel 21 is the force-receiving element, since it receives force from the spindle 1.

The second gear wheel 22 paired with the first gear wheel 21 is part of the worm shaft 24 or connected to the worm shaft 24 in a non-rotatable manner. The third gear wheel 30 paired with the first gear wheel 21 is part of the worm shaft 28 or connected to the worm shaft 28 in a non-rotatable manner. The force is delivered in this manner.

The worm shaft 24 is paired with the worm wheel 25. The worm shaft 28 is paired with the worm wheel 27. The worm wheel 25 is a pressure roller and hence part of the conveyor element. The arrow 42 shows the direction of rotation of the worm wheel 25. The worm wheel 27 is a pressure roller and hence part of the conveyor element. The arrow 41 shows the direction of rotation of the worm wheel 27. The two worm wheels 25 and 27 are arranged opposing one another.

The worm shafts 24 and 28 deliver force to the conveyor element.

Therefore, the first gear wheel 21 is part of the first gear train and also part of the second gear train.

The pressure roller 25 has in particular two functions: on the one hand, as a worm wheel it is part of the worm gear, on the other hand, as a pressure roller, it is part of the conveyor element. The same also applies to the pressure roller 27.

The device comprises the heating element 60 for heating the filament 52.

The two pressure rollers 25 and 27 convey the filament 52, which is arranged in an annular shape around the spindle head 2, in the direction of the delivery element 14. The delivery element 14 comprises the nozzle 18 for delivering the heated filament 52.

In addition, the device 161 comprises a communication interface 53, by means of which information is transmitted to a control unit 57, which is preferably part of the CNC machine tool.

Figure 3:
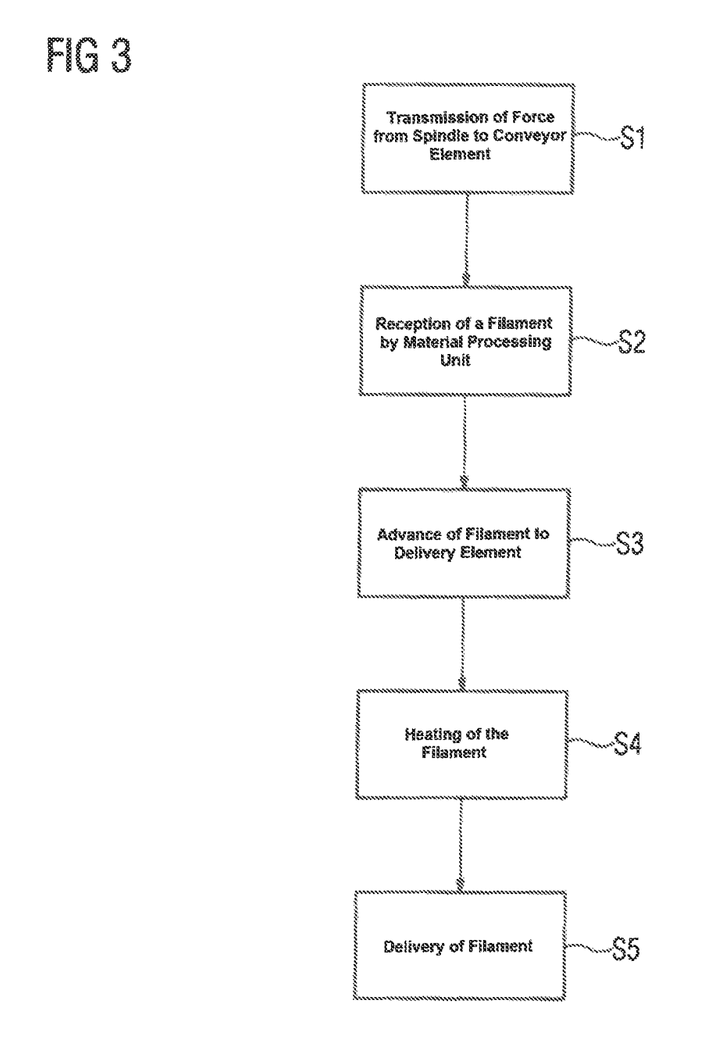

FIG. 3 shows a method for additive manufacturing by means of such a device.

In the method step S1, the force is transmitted from the spindle to the conveyor element by means of the gear.

In the method step S2, the filament is received by the material processing unit and conveyed in the above-described manner in the method step S3 in the direction of the delivery element, in particular in the direction of a nozzle.

In the method step S4, the filament is heated in the delivery element and, in the method step S5, it is delivered by the delivery element.

The heated filament is preferably delivered drop-by-drop or as an extrudate.

The invention claimed is:

1. A device for conveying a filament, said device comprising:
    a holder for coupling the device to a spindle of a machine tool;
    a conveyor element configured to convey the filament and rotatable about an axis of rotation; and
    a material processing unit comprising a combination gear having a gear train including a first gear wheel rotatable about the axis of rotation as a force-receiving element configured to receive an externally applied mechanical rotational force from the spindle, and a second gear wheel and a third gear wheel meshing with the first gear wheel and configured as force-delivery elements separately from the force-receiving element, with each of the second gear wheel and the third gear wheel connected separately via a respective worm shaft of a respective worm gear to a respective worm wheel as the conveyor element to deliver to the conveyor element the mechanical force transmitted purely mechanically from the force-receiving element, wherein the worm wheels operate as actively-driven pressure rollers conveying the filament.

2. The device of claim 1, wherein the force-receiving element is configured to receive a torque from the spindle.

3. The device of claim 2, wherein the force-delivery element is configured to deliver the torque to the conveyor element.

4. The device of claim 1, further comprising a delivery element, said conveyor element conveying the filament in a direction of the delivery element.

5. The device of claim 4, wherein the delivery element includes a nozzle, said conveyor element conveying the filament in a direction of the nozzle.

6. The device of claim 1, wherein the holder includes a filament receptacle in prolongation of a filament-receiving means in the spindle for receiving the filament.

7. The device of claim 1, further comprising a heating element for heating the filament as it advances.

8. The device of claim 4, further comprising a heating element for heating the filament as it advances, said heating element being arranged in the delivery element.

9. The device of claim 1, wherein the material processing unit is configured to form a molded part based on the filament.

10. The device of claim 1, further comprising a control unit and a communication interface communicating with the control unit for transmitting information to the control unit.

11. The device of claim 1, constructed for additive manufacturing of a molded part.

12. The device of claim 1, constructed for fused deposition modeling of a molded part.

13. A machine tool, comprising:
    a spindle; and a device configured for coupling to the spindle of a machine tool, said device comprising a holder attachable to the spindle, a conveyor element configured to convey a filament and rotatable about an axis of rotation, and a material processing unit comprising a combination gear having a gear train including a first gear wheel rotatable about the axis of rotation as a force-receiving element configured to receive an externally applied mechanical rotational force from the spindle, and a second gear wheel and a third gear wheel meshing with the first gear wheel and configured as force-delivery elements separately from the force-receiving element, with each of the second gear wheel and the third gear wheel connected separately via a respective worm shaft of a respective worm gear to a respective worm wheel as the conveyor element to deliver to the conveyor element the mechanical farce transmitted purely mechanically from the force-receiving element,
    wherein the worm wheels are arranged in opposing relationship and operate as actively-driven pressure rollers to convey the filament.

14. The machine tool of claim 13, wherein the force-receiving element of the device is configured to receive a torque from the spindle.

15. The machine tool of claim 13, wherein the spindle includes a channel for passage of the filament, said holder including a filament receptacle in prolongation of the channel.

16. A method for additive manufacturing for forming a molded part, comprising:
    transmitting a force from a spindle of a machine tool via a gear to a conveyor element for advancing a filament and rotatable about an axis of rotation;
    receiving the lament by a material processing unit;
    conveying the filament in a direction of a delivery element with the material processing unit which comprises a combination gear having a gear train including a first gear wheel rotatable about the axis of rotation as a force-receiving element configured to receive an externally applied mechanical rotational force from the spindle, and a second gear wheel and a third gear wheel meshing with the first gear wheel and configured as force-delivery elements separately from the force-receiving element, with each of the second agar wheel and the third gear wheel connected separately via a respective worm shaft of a respective worm gear to a respective worm wheel as the conveyor element to deliver to the conveyor element the mechanical force transmitted purely mechanically from the force-receiving element, wherein the worm wheels are arranged in opposing relationship and operate as actively-driven pressure rollers to convey the filament;
    heating the filament in the delivery element; and delivering the heated filament.

17. The method of claim 16, wherein the filament is conveyed in a direction of a nozzle of the delivery element.

18. The method of claim 16, further comprising communicating information about the spindle and/or filament to a control unit via a communication interface.

19. The method of claim 16, wherein the additive manufacturing comprises fused deposition modeling.

\* \* \* \* \*